United States Patent [19]
Okazaki et al.

[11] 3,851,745
[45] Dec. 3, 1974

[54] ELECTRIC BRAILLE RECORDING AND REPRODUCING SYSTEM

[75] Inventors: Sirou Okazaki, Okayama; Kenjiro Ito, Kawasaki, both of Japan

[73] Assignee: Nippon Typewriter Co. Ltd., Tokyo, Japan

[22] Filed: Oct. 16, 1973

[21] Appl. No.: 406,908

Related U.S. Application Data
[63] Continuation-in-part of Ser. No. 155,803, June 23, 1971, abandoned.

[30] Foreign Application Priority Data
June 29, 1970 Japan.............................. 45-56699
June 29, 1970 Japan.............................. 45-56700

[52] U.S. Cl................................. 197/6.1, 35/35 A
[51] Int. Cl............................................. B41j 3/32
[58] Field of Search..................... 197/6.1; 35/35 A; 346/74 M

[56] References Cited
UNITED STATES PATENTS

| | | | |
|---|---|---|---|
| 1,921,000 | 8/1933 | Naumburg | 197/6.1 UX |
| 1,953,307 | 4/1934 | Naumburg | 197/6.1 |
| 2,521,338 | 9/1950 | Bryce et al. | 197/6.1 UX |
| 2,668,283 | 2/1954 | Mullin | 346/74 M UX |
| 2,972,140 | 2/1961 | Hirsch | 35/35 A X |
| 3,007,259 | 11/1961 | Abma et al. | 35/35 A |
| 3,217,329 | 11/1965 | Gabor | 346/74 M |
| 3,230,644 | 1/1966 | Irazoqui | 35/35 A |
| 3,289,327 | 12/1966 | Chevillon | 197/6.1 UX |
| 3,624,772 | 11/1971 | Grunwald | 197/6.1 |
| 3,640,368 | 2/1972 | Weinberger | 197/6.1 |

*Primary Examiner*—Ernest T. Wright, Jr.
*Attorney, Agent, or Firm*—Fleit & Jacobson

[57] ABSTRACT

Disclosed is an electric braille recording and reproducing system for the blind which not only permits information to be recorded in the form of electric signals of different frequencies on a magnetic recording tape, but also permits the information thus recorded to be retrieved from the tape in the form of the six-point code, thereby drastically reducing the bulky amount of documents in braille which would otherwise be inevitable. The electric braille recording and reproducing system is also useful in the education of the blind.

18 Claims, 2 Drawing Figures

ELECTRIC BRAILLE RECORDING AND REPRODUCING SYSTEM

RELATED APPLICATION

This is a continuation-in-part of application Ser. No. 155,803, filed June 23, 1971, now abandoned.

BACKGROUND OF THE INVENTION

This invention relates to an improvement of the typewriter for the blind. More specifically, this invention relates to an electric braille recording and reproducing system which is particularly useful in the education of the blind or in mastering braille or raised letters.

The conventional typewriter for the blind is expensive, large and difficult to operate. The operator sets the six operating rods in the head block of the typewriter and then pushes down a foot-pedal to cause the operating rods to emboss a sheet of paper with a raised letter in the form of a six-point code. This operation necessitates effort and skillfulness. These and other defects can be eliminated by this invention. In addition to these conventional mechanical typewriters, electronic devices have been employed to produce braille characters. One of these devices is shown in Chevillon U.S. Pat. No. 3,289,327. This patent shows a device for recording electric signals representing braille characters on a magnetic tape. This device employs a dual track recorder which records voice signals on one track and the braille character signals on the other of the dual tracks. The braille character signals originate from six oscillators, one oscillator for each of the six points in the braille character code. In operating the Chevillon device, the characters are coded by individually pressing the proper keys corresponding to the points of the braille character being coded. As each key is pressed a signal is recorded on a continuously running tape, thus when playing back the recorded signal output, lights or plungers are activated one at a time until all the output lights or plungers corresponding to the character have been activated and read.

There are however several disadvantages with devices of the Chevillon type. First of all, the system requires a separate oscillator for each braille character point. Second, the use of a continuously running recording means produces a recorded tape with pauses between the recorded characters. Third, the output is often confusing since each point is activated one at a time rather than simultaneously.

The electric braille recording and reproducing system for the blind according to this invention is inexpensive, small and light, and easy to operate. It not only permits information to be recorded in the form of electric signals of different frequencies in a magnetic recording tape, but also permits the information thus recorded to be retrieved from the tape in the form of the six-point code, thereby drastically reducing the bulky amount of documents in braille which would otherwise be inevitable. The electric braille recording and reproducing system according to this invention is useful in the education of the blind or in mastering braille or raised letters. Suppose that the braille recording and reproducing system is set in the position for reproducing the information from the tape and for sending the same in the form of electric signals to a reading and embossing block. Then six pin rods will be selectively projected from the plane of the reading and embossing block in the form of six-point code corresponding to the electric signal. A blind student touches the projecting ends of the pin rods on the reading and embossing block with his fingers to read a letter in the form of six-point code.

The main object of the invention is to provide a system for recording and reproducing braille characters using a signal generator comprised of a plurality of oscillators in which the number of oscillators is less than the number of points in the braille character and it is a specific object of the present invention to use only these oscillators to produce all signals necessary to generate all characters of the six-point braille code.

A further object of the present invention is to provide means for simultaneously recording and reproducing signals corresponding to the six points in the braille character.

A still further object of the invention is to provide a system which permits the stopping of the recording device between the recording of each character while preventing distorted signals from being recorded during the starting period of the recorder.

DESCRIPTION OF THE DRAWING

The invention will be better understood from the following description which is made with reference to the accompanying figures depicting a preferred embodiment of this invention.

DETAILED DESCRIPTION OF DRAWINGS

Figure 1:
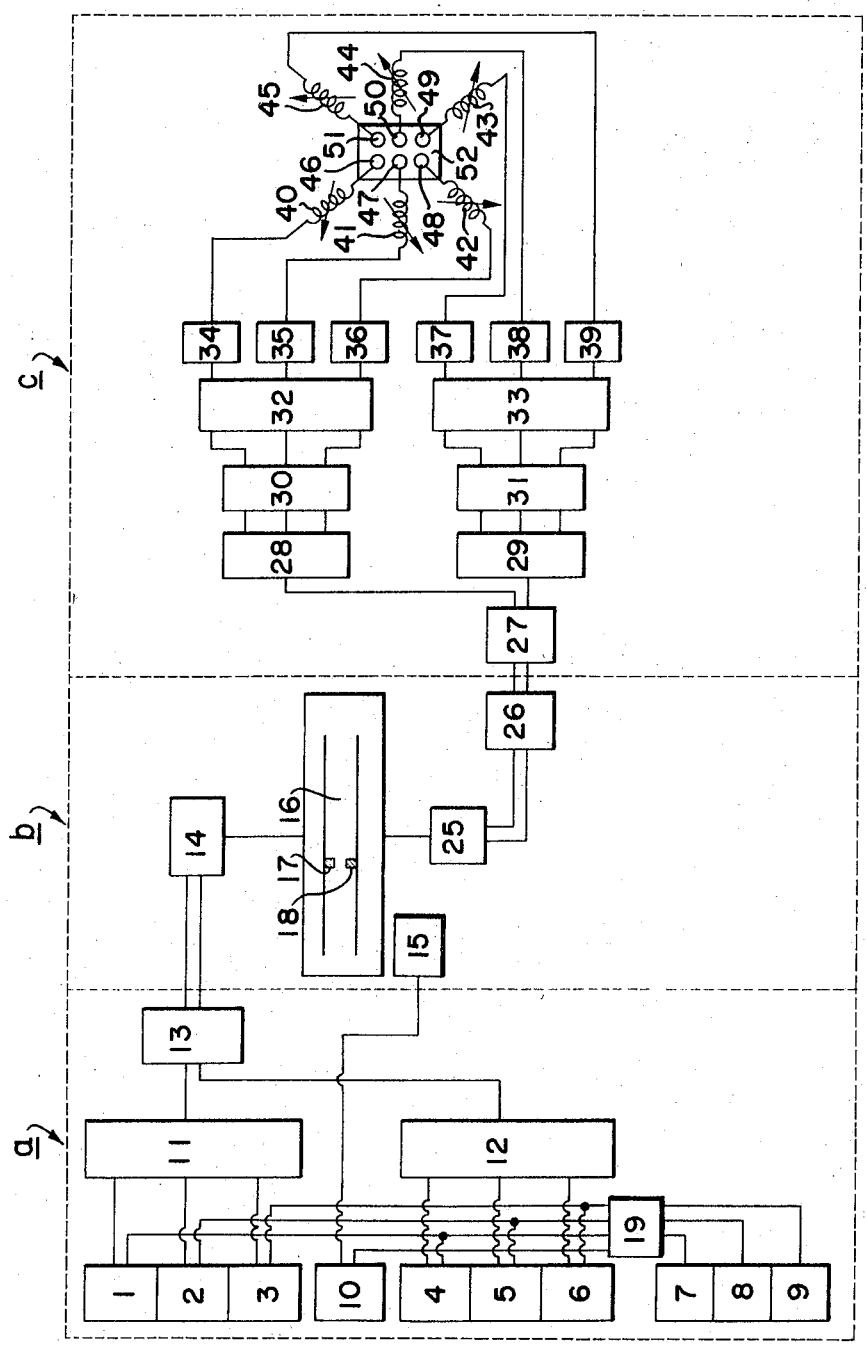
FIG. 1 is a block diagram of the invention.

In the preferred embodiment given in FIG. 1, a pair of conventional mixer circuits 11 and 12 are used. These mixer circuits 11, 12 function to mix electrical signals of different frequencies which are selectively supplied from a standard signal generator 20 comprised of known oscillators 7, 8 and 9 which provides combinations of electric signals having different frequencies. The use of the mixers 11 and 12 although not essential to this invention, will reduce the number of the different frequencies which a signal generator 20 must generate to provide a sufficient number of electric signals to record and reproduce all of the braille letters.

Referring to FIG. 1, an electric typewriting section $a$ encircled by a broken line includes six point keys 1 to 6 corresponding to the six points which are used in forming a braille or raised letter. These six point keys are divided into two groups 1, 2, 3 and 4, 5, 6, and the three-point keys of each group 1, 2, 3, or 4, 5, 6 are operatively connected to signal generators 7, 8 and 9 each generating electric signals of different frequencies, $f_1$, $f_2$ and $f_3$ respectively corresponding to the frequencies 300 Hz, 3,000 Hz and 8,000 Hz in the preferred embodiment. More specifically, point keys 1 and 4, 2 and 5 and 3 and 6 are operatively connected to oscillators 7, 8 and 9 respectively.

This embodiment uses a known signal generator 20 with three different conventional oscillators 7, 8 and 9 which may be replaced by a signal standard oscillator and a conventional frequency divider or multiplier to produce the three distinct frequencies.

Master key 10 is comprised of switches 58 and 59 which activate and deactivate the oscillator control 19 and the conventional tape drive mechanism 15 respectively. The activation of oscillator control 19 allows the ac signal output from the oscillators 7, 8 and 9 to flow to the respective point keys 1 to 6.

Figure 2:
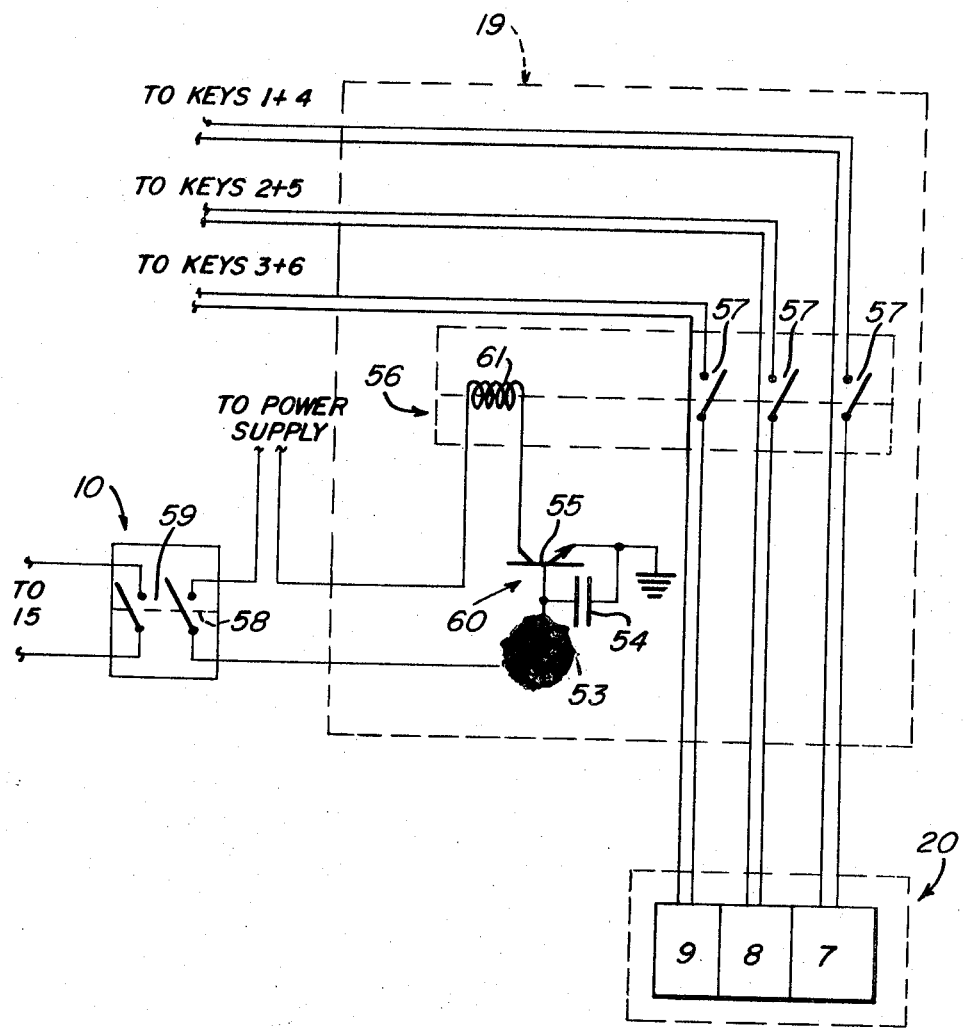
FIG. 2 is a detailed drawing of oscillator control 19.

As shown in detail in FIG. 2, the oscillator control 19 functions to prevent the oscillator outputs from being supplied to the mixers 11 and 12 before the standard tape drive mechanism 15 has started and reached a given constant speed. When master key 10 is pressed, switch 58 closes sending current to the relay control circuit 60. The R-C combination of resistor 53 and capacitor 54 of circuit 60 operate as a time delay of sufficient duration to allow the tape drive mechanism 15, which is conventionally controlled by switch 59, to reach a constant speed before transistor 55 is energized. Transistor 55, when turned on, allows current to flow through coil 61 of relay 56 energizing same, closing the normally open relay switches 57 on the output lines from the oscillators 7, 8 and 9, whereupon the output signals can now pass to the point keys 1 to 6 and through whichever point keys 1 to 6 are depressed to the corresponding mixer 11 or 12.

Suppose for example that point keys 1, 4 and 6 are pushed. They remain closed, held by conventional latching means (not pertinent to the present inventive concept) until released at the completion of recording the individual character as hereinafter noted. The master key 10 is depressed which starts standard tape drive mechanism 15 by conventional means and activates oscillator control 19, by closing switches 59 and 58 respectively. After the time delay produced by R-C circuit 53-54, transistor 55 becomes conductive energizing relay 56 permitting oscillator signals $f_1$, $f_2$ and $f_3$ to be supplied through the closed switches 57 to the respective point keys 1 to 6.

This allows the electric signal $f_1$, associated with depressed point key 1, to pass to the mixer 11. Simultaneously the signals associated with depressed point keys 4 and 6 signals $f_1$ and $f_3$ respectively, pass to mixer 12. Thus regardless of the number of point keys 1 to 6 which have been depressed, the mixers 11 and 12 provide only two different electric signals which may be amplified by amplifier 13, and then recorded or directly sent to a reading system hereinafter described.

The resultant signals from amplifier 13 are sent to a magnetic stereophonic recording head 14 included in the magnetic record and playback section $b$ encircled by broken lines in FIG. 1. More specifically, stereophonic signals amplified by amplifier 13 are recorded as indicated at points 17 and 18 by means of a standard dual channel recording head 14 on magnetic tape 16 which is driven by a conventional tape mechanism 15.

The recording is now complete and master key 10 is released opening switch 58 which correspondingly deactivates oscillator control 19 by cutting off the current flowing through circuit 60 and relay 56 thus opening switches 57 which blocks the output of oscillators 7, 8 and 9 from passing to point keys 1 to 6. The release of master key 10 simultaneously opens switch 59 deactivating tape drive mechanism 15 by conventional means, stopping magnetic tape 16. The point keys 1, 4 and 6 which were depressed are opened by releasing the standard latching means. The typewriting section $a$ is now reset and a second character can be recorded by repeating this procedure.

The invention is also capable of reproducing the recorded braille character. A magnetic stereophonic reproducing head 25 functions to reproduce electric signals recorded in two channels on the recording tape 16, and the electric signals thus reproduced are directed via a known dual channel amplifier 26 to the braille reading section $c$. The amplifier 26 is followed by a conventional amplitude leveling apparatus 27, which functions to reform and equalize electric signals of different frequencies from the amplifier 26. The reformed electric signals are supplied to a pair of standard frequency discriminators 28 and 29 to select elemental signals of component frequencies in each of the two channels. These discriminators 28 and 29 are followed by amplifiers 30 and 31 and known pulse generators 32 and 33. The elemental signals corresponding to those which were selectively supplied from the signal generators 7, 8 and 9 to the mixers 11 and 12, are directed via the amplifiers 30 and 31 to pulse generators 32 and 33 and then to conventional dc amplifiers 34, 35, 36, 37, 38, and 39.

These pulse generators 32 and 33 function to produce an impulse each and every time when they receive the ac signal from the discriminator associated therewith. Impulses thus produced will be smoothed and amplified in the dc amplifiers 34 to 39. The dc amplifiers 34 to 39 are connected to the coils of electromagnets 40, 41, 42, 43, 44 and 45. These electromagnets 40 to 45, when energized, will selectively drive the six pin rods 46 to 51. More specifically, the six pin rods 46 to 51 are arranged in a reading and embossing block 52, and the energizing of any combination of the electromagnets 40 to 45 will cause the pin rods 46 to 51 associated therewith to project from the plane of the reading and embossing block 52.

According to the previous example, the electric signal $f_1$ which was generated and recorded in the magnetic recording tape 16 by pushing the point key 1, will be reproduced in section $b$ and will be directed to the pulse generator 32 and the dc amplifier 34 and finally will be supplied in the form of an impulse to the electromagnet 40. The resultant signal, $f_1$ plus $f_3$, caused by simultaneously operating the point keys 4 and 6 will be likewise, reproduced in section $b$ and decomposed by the discriminator 29. Then, the elemental signal, $f_1$, will be directed to the pulse generator 33 and then to the dc amplifier 37, the elemental signal now in the form of an impulse. The elemental signal $f_3$, will be supplied via the pulse generator 33 and the dc amplifier 39 to the electromagnet 45. Thus, the pin rods 46, 49 and 51 are simultaneously projected from the reading and embossing block 52 in the form of a raised braille letter. When the magnetic tape 16 is running, different braille points will appear on the reading and embossing block 52 in rapid succession.

What is claimed is:

1. In a braille recording and reproducing system, signal generator means for producing ac signals of different frequencies, at least two mixer circuits connected to said signal generator means for mixing signals selectively supplied thereto from said signal generator means, a braille keyboard including a master key and two sets of point keys corresponding to the six points in a braille character, each of said sets of point keys consisting of three-point keys, one of said sets of point keys when selectively pushed supplies accordingly different ac signals from said signal generator means to one of said mixer circuits and the other of said sets of point keys supplies different ac signals from said signal generator means to the other of said mixer circuits, dual channel magnetic recording and reproducing means operatively connected to said mixer circuits for recording on a recording medium electric signals each consisting of a combination of different frequencies depending on which of said point keys were operated, and an oscillator control circuit to supply simultaneously said different ac signals preselected by said two sets of point keys to both of said mixer circuits after a given time delay sufficient to allow said recording and reproducing means to start and reach a constant speed, and said master key operatively coupled to said magnetic recording and reproducing means and to said oscillator control circuit to initiate operation thereof responsive to actuation of said master key.

2. The system of claim 1 in which two frequency discriminators are connected to said magnetic recording and reproducing means, two pulse generators connected to said discriminators and two sets of dc amplifiers connected to said pulse generators, each set of dc amplifiers consisting of three dc amplifiers, and in which a reading and embossing block having movable elements is connected to said dc amplifiers to produce the points of said braille character when energized by electric pulses from said dc amplifiers.

3. The system of claim 1 in which said signal generator means comprises a plurality of oscillator means in which the number of said oscillator means is less than the number of said point keys.

4. The system of claim 1 and further comprising amplifying means for amplifying the output signals from said mixer circuits.

5. The system of claim 2 in which said movable elements of said reading and embossing block comprise movable pin rods.

6. The system of claim 5 and further comprising electric coil means connected to said dc amplifiers and said pin rods and operable to move said pin rods when energized by electric pulses from said dc amplifiers.

7. In a braille recording and reproducing system, signal generator means for producing ac signals of different frequencies, at least two mixer circuits connected to said signal generator means for mixing signals selectively supplied thereto from said signal generator means, a braille keyboard including a master key and two sets of point keys corresponding to the six points in a braille character, each of said sets of point keys consisting of three-point keys, one of said sets of point keys when selectively pushed supplying accordingly different ac signals from said signal generator means to one of said mixer circuits and the other of said sets of point keys supplying different ac signals from said signal generator means to the other of said mixer circuits, said master key being operable to simultaneous supply said different ac signals preselected by said two sets of point keys to both of said mixer circuits, and dual channel magnetic recording and reproducing means operatively connected to said mixer circuits for recording on a recording medium electric signals each consisting of a combination of different frequencies depending on which of said point keys were operated.

8. The system of claim 7 in which two frequency discriminators are connected to said magnetic recording and reproducing means, two pulse generators connected to said discriminators and two sets of dc amplifiers connected to said pulse generators, each set of dc amplifiers consisting of three dc amplifiers, and in which a reading and embossing block having movable elements is connected to said dc amplifiers to produce the points of said braille character when energized by electric pulses from said dc amplifiers.

9. The system of claim 7 in which said signal generator means comprises a plurality of oscillator means in which the number of said oscillator means is less than the number of said point keys.

10. The system of claim 7 and further comprising amplifying means for amplifying the output signals from said mixer circuits.

11. The system of claim 8 in which said movable elements of said reading and embossing block comprise movable pin rods.

12. The system of claim 11 and further comprising electric coil means connected to said dc amplifiers and said pin rods and operable to move said pin rods when energized by electric pulses from said dc amplifiers.

13. In a braille recording and reproducing system, a braille keyboard including two sets of point keys corresponding to the six points in a braille character, each of said sets of point keys consisting of three-point keys, signal generator means for producing a number of frequencies less than the number of said point keys, at least two mixer circuits connected to said signal generator means for mixing signals selectively supplied thereto from said signal generator means such that when one of said sets of point keys is selectively pushed it supplies accordingly different ac signals from said signal generator means to one of said mixer circuits and the other of said sets of point keys supplies different ac signals from said signal generator means to the other of said mixer circuits and dual channel magnetic recording and reproducing means operatively connected to said mixer circuits for recording on a recording medium electric signals each consisting of a combination of different frequencies depending on which of said point keys were operated.

14. The system of claim 13 in which two frequency discriminators are connected to said magnetic recording and reproducing means, two pulse generators connected to said discriminators and two sets of dc amplifiers connected to said pulse generators, each set of dc amplifiers consisting of three dc amplifiers, and in which a reading and embossing block having movable elements is connected to said dc amplifiers to produce the points of said braille character when energized by electric pulses from said dc amplifiers.

15. The system of claim 13 in which said signal generator means comprises a plurality of oscillator means in which the number of said oscillator means is less than the number of said point keys.

16. The system of claim 13 and further comprising amplifying means for amplifying the output signals from said mixer circuits.

17. The system of claim 14 in which said movable elements of said reading and embossing block comprise movable pin rods.

18. The system of claim 17 and further comprising electric coil means connected to said dc amplifiers and said pin rods and operable to move said pin rods when energized by electric pulses from said dc amplifiers.

* * * * *